Aug. 22, 1967
M. K. RICHMOND
3,337,017
LOAD LIMITING POWER TRANSMISSION SYSTEM
Filed Oct. 22, 1965
2 Sheets-Sheet 1
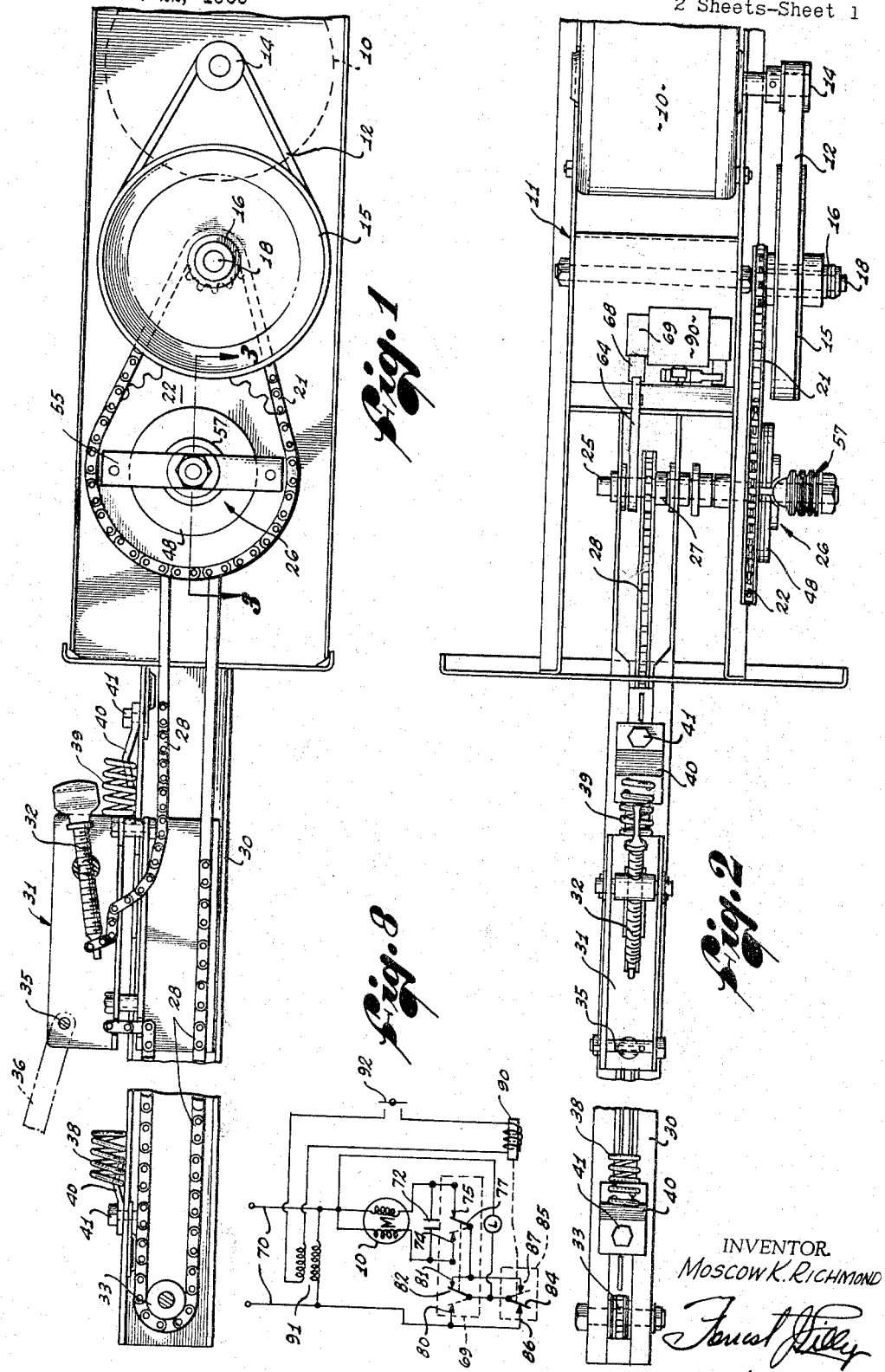
INVENTOR.
MOSCOW K. RICHMOND
ATTORNEY

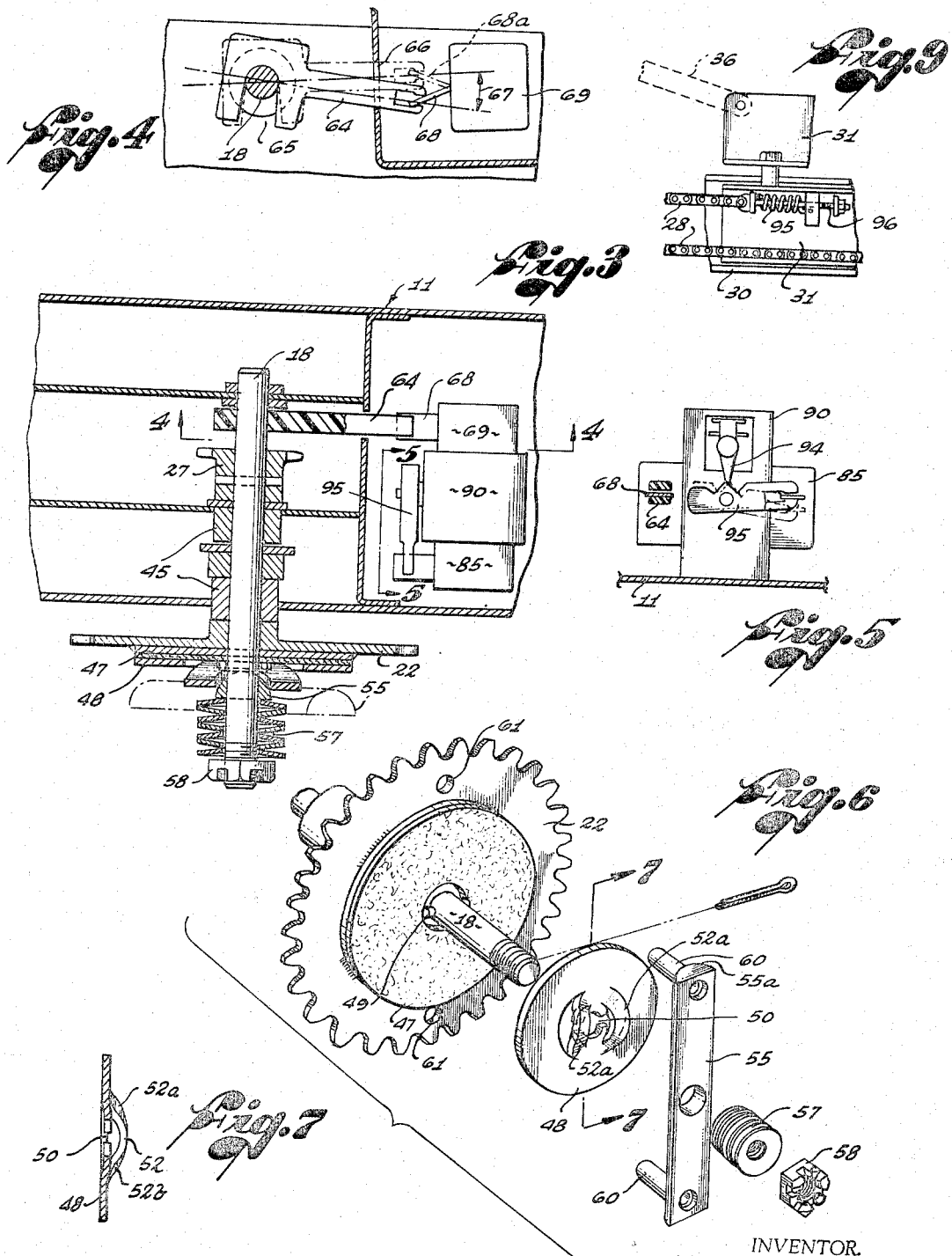

United States Patent Office 3,337,017
Patented Aug. 22, 1967

3,337,017
LOAD LIMITING POWER TRANSMISSION SYSTEM
Moscow K. Richmond, 2819 Butler Ave.,
Los Angeles, Calif. 90064
Filed Oct. 22, 1965, Ser. No. 502,177
13 Claims. (Cl. 192—150)

The present invention in its broader aspects relates to a power transmission system; and more particularly to a safety mechanism or overload release mechanism which is responsive to stoppage or overload conditions to shut off the power. This may be characterized generally as a mechanism which responds to a change in speed of the load operated by the power transmitting system.

Because the system has been developed particularly in connection with a door operator to open and close doors, for example, overhead type garage doors, the system will be disclosed and explained in this aspect; but it will be understood that the system is not necessarily limited to any particular type of load or object to be driven or moved.

A door operator is a typical example of a load which includes a member moved back and forth over a given path. As the door is moved between open and closed positions, it retraces a given path and moves over a predetermined length of travel. In order to control the application of power to move such a member, it has been known to provide two limit switches that, upon actuation, shut off the power to the motor driving the door. These limit switches are each so located that the door is expected to reach one end of the path of travel at the time it engages a switch. However, the principle involved is to shut off the power as the door passes and actuates a switch, and not by necessarily reaching the end of the path. Of course, the latter condition is to be desired and is preferable from the standpoint of control since it ensures full excursions of the door at all times. Limit switches are oftentimes difficult to adjust properly in order to obtain full travel, a condition that is particularly desirable upon the closing movement of the door; and switches of this character are subject to being moved out of adjustment with resultant poor operation of the door.

An installation of this type also has another major objection and that is that no means are provided for stopping the door at a point intermediate the ends of the normal range of travel. Shutting off the power and stopping the door can be highly advantageous when movement of the door is blocked by some foreign object in the doorway or by some malfunction of the door suspension mechanism. This emergency condition has been provided for in known devices by adding a safety device, such as a load limiting friction clutch, a shear pin, or a thermal relay opened by an overloaded condition of the motor. Devices of this character are generally lacking in the desired degree of sensitivity and keep the power on so long that damage or injury can be done to an object interfering with movement of the door or the motor may be burned out before the relay functions. Such safety devices often malfunction from lack of proper maintenance. For example, a friction clutch which is used only under emergency conditions often fails to release when needed because the clutch plates adhere to each other from a long continued lack of relative motion.

Thus it is a general object of the present invention to provide a novel type of power transmission system which incorporates overload or safety mechanism responsive to a change of speed in the load as when the load reaches the end of its normal travel.

Another object of the invention is to provide a system of the character described which includes safety mechanism that operates to shut off power at any point in the travel of the load in response to overload conditions resulting in a slow down or stoppage in the movement of the load.

It is also an object of the present invention to provide a power transmitting system of the character described which includes safety or overload release mechanism which not only shuts off power as a result of stoppage at some intermediate point in the range of travel but also operates in response to the door or similar object reaching the normal end of its travel path, thereby keeping the safety mechanism in properly operation condition.

These objects of the present invention have been achieved by providing a power transmitting system which comprises an output shaft which is operatively connected to a load, for example, a door, and which is driven from a power input member through suitable clutch means comprising a pair of friction discs which are mounted concentrically with the output shaft. Cam and spring means apply a predetermined axial thrust to one of the clutch plates to hold the two plates in driving relation, the spring yielding when a torque in excess of a predetermined limit is applied to reduce the thrust and disengage the plates, at least momentarily. Means are provided to effect reverse direction of the output shaft during the momentary disengagement of the clutch; and a control arm, frictionally engaging the shaft, is thereby rocked between two different position by the movement of the output shaft. This control arm operates a switch which, in turn, controls supply of power to the motor; and the reverse movement of the shaft and the arm causes the switch to interrupt the power supply.

How the above objects and advantages of the present invention, as well as others not specifically referred to herein, are achieved will be better understood by reference to the following description and to the annexed drawings, in which:

FIG. 1 is a side elevation of door operator embodying the present invention, the door itself being omitted from the drawing.

FIG. 2 is a plan view of the door operator of FIG. 1.

FIG. 3 is an enlarged fragmentary median section on line 3—3 of FIG. 1.

FIG. 4 is a fragmentary vertical section on line 4—4 of FIG. 3 showing the control arm frictionally engaging the output shaft and the switch operated thereby.

FIG. 5 is a fragmentary vertical section on line 5—5 of FIG. 4 illustrating the motor reversing switch.

FIG. 6 is an exploded perspective view of the elements of the clutch and torque limiting means shown assembled in FIG. 3.

FIG. 7 is a median section through one clutch plate and attached cam means on line 7—7 of FIG. 6.

FIG. 8 is a wiring diagram of a motor control circuit.

FIG. 9 is a fragmentary side elevation of a variational form of spring means for momentary reversal of the output shaft.

Referring now to the drawings, and particularly to FIGS. 1 and 2, it will be seen that the door operator illustrated therein comprises a prime mover, preferably an electric motor 10, mounted on a skeleton frame indicated generally at 11 by which the entire unit may be mounted in any desired location. Speed reduction is obtained by belt 12 which passes over pulley 14 on the motor output shaft and a larger pulley 15 that is secured to sleeve 16 which is rotatably mounted upon fixed shaft 18 which, in turn, is supported by elements of frame 11.

Sleeve 16 extends at one side beyond pulley 15 to provide room for mounting on the sleeve drive sprocket 20 which thus rotates in unison with pulley 15. Chain 21 passes over drive sprocket 20 and also over a larger sprocket 22 mounted on shaft 25. As will be further explained, sprocket 22 is the power input member for the clutch mechanism and torque limiting assembly indicated generally at 26 and which will be described in detail later.

Shaft 25 is the power output shaft of the assembly 26 and has mounted on it at a suitable location sprocket 27 over which passes chain 28 to be driven thereby.

Attached to frame 11 and extending outwardly at one side therefrom is the channel-shaped track 30 along which slides carriage 31 in a reciprocating, linear path. One end of chain 28 is attached to carriage 31 by suitable means, such as take-up screw 32 which enables adjustment to be made in the tension in chain 28. From its connection with carriage 31, chain 28 extends over and around drive sprocket 27 and then to the outer end of the track where the chain passes over idler sprocket 33, as may be seen particularly in FIG. 1. The upper run of the chain then extends in the reverse direction to a point of connection with carriage 31. This latter point of connection, indicated at 34, is normally a fixed connection and is spaced from the connection of the chain by means of adjusting screw 32.

Carriage 31 carries a transverse bolt 35 or the like to which is connected operating rod 36 which may be of any suitable design and extends to a point of connection with a door, not shown, in order to raise and lower the door, in the case of an overhead type installation, or to swing the door around its axis in the case of a hinged door.

Reference may be made to my copending application, Ser. No. 374,768, filed June 12, 1964, entitled Door Operator With Speed-Change Sensing Mechanism, wherein the details of the track and carriage are described and claimed.

The amount of movement imparted to the door or other load being moved by connecting rod 36 depends, of course, upon the length of the path through which carriage 31 travels. This, in turn, is limited by engagement of the carriage with the two abutments 38 and 39 located at the respective ends of the linear path of travel of carriage 31. In this embodiment of the invention, the abutments 38 and 39 are shown as being helical coil springs, as a preferred example of spring means for such abutments. These springs are each held in place by attachment to a clip 40 which is adjustably positioned along the top of track 30 and is held in any selected position by tightening bolt 41 which clamps the associated clip 40 to the track. Thus the two springs 38 and 39 provide the resilient abutment means for limiting the travel of carriage 31; and other functions of these resilient members will be discussed later.

Returning now to the assembly 26 comprising the clutch elements and the cam means for limiting the torque transmitted by the clutch, the details for this assembly are shown in FIGS. 3 and 6. Shaft 18 is the power output shaft of this assembly and it is rotatably mounted in bearings 45 which, in turn, are mounted on portions of frame 11. Sprocket 27, which may be considered as the final driven member of this assembly, is pinned or otherwise non-rotatably secured to shaft 18, as shown in FIG. 3. Rotation of this sprocket drives chain 28, as described above.

The power input member to this assembly is the large sprocket 22 which is loosely mounted on shaft 18 to be concentric therewith and is free, under conditions to be described, to turn relative to the shaft.

Clutch means are provided comprising a pair of clutch discs 47 and 48 which are concentrically mounted with respect to shaft 18. The driving member 47 of the pair of clutch discs is attached in any suitable manner to one side face of drive sprocket 22; the other or driven member 48 of the pair of clutch discs is capable of at least limited axial movement on shaft 18 and when in contact with clutch disc 47, is held non-rotatably with respect to shaft 18 by means of pin 49 which engages a pair of opposed shoulders provided by transverse slot 50 in clutch disc 48. The two discs form a friction clutch and they may be provided with any type of lining or facing deemed desirable in order to transmit from one disc to the other the required power.

In order to provide the thrust necessary to establish a power transmitting relationship between the two clutch discs, cam means are provided for applying this thrust axially of the clutch plates and shaft 18. The cam means includes two cam members or elements which cooperate with each other. One cam element is on driven disc 48 and is provided in a preferred embodiment by a particular configuration imparted to the disc by a stamping operation. From FIGS. 6 and 7, it will be seen that two pairs of concentric arcuate cuts are made in the disc and the arcuate portion of the disc in between each pair of cuts is then raised beyond one surface of the disc, as shown in FIG. 7. This operation provides a pair of cams 52 having operational surfaces 52a and 52b which are axially inclined with respect to clutch disc 48. It will be realized that this particular configuration of the disc whereby the cam is made as an integral part of the disc is optional and the cam may be of other shape or design.

A second cam element, which serves as a follower with respect to the cam elements 52, is in the form of a half round bar 55 which is loosely mounted on shaft 18 to turn with respect to the shaft. The rounded face of bar 55 is engageable with the surfaces 52a and 52b of cam 52 in such a way that rotation of cam 55 around shaft 18 produces an axial thrust on disc 48 which, in turn, holds the driven disc into power transmitting relation with the driving disc of the clutch.

Of course, the engagement between the rounded surface 55a and one of the inclined surfaces 52a or 52b produces a reaction along the axis of shaft 18 which is opposed by spring means of suitable design, as, for example, the Belleville washers 57. Several of these washers are mounted near the end of shaft 18 and the amount of compression which they undergo, and consequently the thrust exerted by the cam elements against the clutch discs, can be adjusted as desired by tightening or loosening adjusting nut 58 on the threaded end of shaft 18. Nut 58 reduces or enlarges the distance between the nut and the fact of cam bar 55, to obtain the operating results desired.

In order to obtain this rotational movement of cam follower or element 55, it is driven in unison with sprocket 22. This is accomplished by providing at each end of bar 55 an axially extending pin 60, the two pins being spaced far enough apart to span the clutch discs and to enter diametrically spaced holes 61 in sprocket 22. Thus the cam bar is free to move axially at all times on shaft 18 but is also drivingly connected to sprocket 22 by the two pins 60.

As shown particularly in FIGS. 3 and 4, shaft 18 has mounted upon it control arm 64. The base of the control arm has a slot 65 which opens laterally to one side of the control arm and is shaped at its inner end to receive snugly shaft 18. The frictional engagement between the shaft and the sides of slot 65 is of such a nature that, if unrestrained, control arm 64 is rotated by and with shaft 18; but when the arm is restrained, shaft 18 rotates within slot 65. Arm 64 projects through an opening 66 in a wall of skeleton frame 11. When it engages the upper edge of the opening, as shown in solid lines in FIG. 4, the arm is restrained against counterclockwise rotation as shaft 18 turns in that direction. However, when shaft 18 turns in the clockwise direction, frictional engagement of the arm with the shaft causes the arm to shift its position angularly and move clockwise until the arm comes into engagement with the lower edge of opening 66, as shown in dotted lines in FIG. 4 This opening allows the shaft to move angularly through the arc indicated at 67; but the arm is restrained to prevent rotation with shaft 18 beyond this limited amount.

The outer end of the arm engages leaf 68 which is the mechanical means operating electric switch 69. This switch is in the electrical circuit illustrated in FIG. 8 controlling the operation of motor 10.

The electrical circuit for the door operator shown by the wiring diagram of FIG. 8 is a preferred circuit of the type employed when prime mover 10 is a reversible motor, as is the usual case when a door is to be moved between open and closed positions, requiring that carriage 31 reciprocate between positions at the opposite ends of its normal path of travel. The circuit is connected to a suitable source of electrical power, not shown in the drawings, but which may be assumed to be the usual domestic 110 volt, 60 cycle supply, by a pair of conductors 70. Motor 10 is of the reversible type and has two stator coils which are connected in parallel to one of the conductors 70 with capacitor 72 connected across the stator coils. These coils of the motor are respectively connected to fixed contacts 74 and 75 of switch 69. These two fixed contacts cooperate with movable contact 77 to form a single-pole, double-throw switch. Switch 69 also includes another single-pole, double-throw switch, which comprises fixed contacts 80 and 81 which cooperate with movable contact 82. Movable contacts 77 and 82 of switch 69 are ganged together and are shifted simultaneously by the switch operating arm 68 when the latter is moved between the two positions shown in FIG. 4, the movable contacts 77 and 82 being moved between the solid line and the dotted line positions shown in the wiring diagram. The two switches are thus tied together to be two sections of a double-pole, double-throw switch. Movable contact 77 of the first switch section mentioned is connected electrically to fixed contact 81 of the second switch section. Fixed contact 80 of the second switch section is connected to the other supply conductor 70, while the movable contact 82 of the second switch section is connected to movable contact 84 of switch 85.

Relay 85 includes a single-pole, double-throw switch comprising a pair of fixed contacts 86 and 87 cooperating with movable contact 84 shifted by coil 90. Contact 87 is connected to fixed contact 81 and movable contact 77 of switch 69, while the opposite fixed contact 86 of the relay is connected to the second supply conductor 70, the same as switch contact 80. The movable contact 84 is shifted in position by energizing relay coil 90 which is energized by low voltage current derived from the secondary of transformer 91. The primary of transformer 91 is connected across the two supply conductors 70. In series with relay coil 90 and the transformer secondary is manual push button 92 which is typical of means normally provided for energizing coil 90 in order to place the door operator in operation. There may be provided in parallel with, or in lieu of, manual push button 92 other switching means which are operated mechanically or by some type of remotely controlled means; but such other circuit components are basically in addition to the circuit elements shown and do not modify or change the operation of the circuit. Accordingly, they form no part of the present invention.

All the double-throw switches indicated in the wiring diagram are of the snap-action or over-center type in which the movable contacts are spring biased into engagement with either one of the two fixed contacts with which they cooperate. Accordingly, successive energizations of relay coil 90 shift movable contact 84 between the full line and dotted line positions; but the switch is normally closed in one position or the other and never remains open. Likewise the two sections of switch 69 are normally closed in one of the two positions shown and do not remain open.

Relay 85 and switch 69 are all built together in a single unit thereby forming in effect a multi-pole switch having three sections that are double-throw sections that are normally closed in one of two alternate positions. Two sections are ganged together and are operated together mechanically by arm 68. The third section is operated electromagnetically by coil 90. The third section has its movable contact connected to the movable contact of one other section, the latter having its fixed contacts connected to the respective fixed contacts of the third section of the switch unit.

Assume that the movable contacts all occupy the solid line positions shown in the wiring diagram. The circuit is now completed from one of the two supply conductors 70 through the motor coil driving the motor in a forward direction and then in succession through contacts 75, 77, 81, 82, 84, and 86, to the other supply conductor. At the end of the door movement in the opening direction, switch lever 68 is moved, as will be explained, to the solid line position, thereby shifting the contacts 77 and 82 to the dotted line positions and opening the circuit at 81, 82 through motor 10. The motor is now de-energized and accordingly stops. The motor remains in this state until, by pressing push button 92, relay coil 90 is energized. This coil, when energized, moves the movable contact 84 from the solid line position to the dotted line position into engagement with contact 87. Now the circuit is completed through the other motor stator coil, thereby driving the motor in the reverse direction, in succession through fixed contact 74 and movable contact 77 of switch 69, to contacts 87 and 84 of relay 85 and thence through contacts 82 and 80 of switch 69 to the other supply conductor. At the end of the reverse movement of carriage 31 closing the door, it will be seen that the movement of switch arm 68 back to the dotted line position 68a of FIG. 4 again opens the circuit through the motor and de-energizes the motor, bringing it to a stop, by shifting movable contacts 77 and 82 back to the alternate solid line position shown. Solenoid 90 and switch 85 are shown in FIG. 5 wherein it will be seen that the arm 94, which is moved downwardly by each energization of the coil, causes pivoted arm 95 to change positions, thus effecting the shift of the movable contact 84 between engagement with contacts 86 and 87 as described.

Having described the construction of the present invention, its operation will now be set forth. Assume that motor 10 is energized and being driven in a direction such that carriage 31, which may be regarded as the load, is being moved from left to right in FIG. 1. Normally this is the direction in which the door is being opened, that is, a tension is being applied to connecting rod 36. In this condition of operation, sprocket 22 is turning in a clockwise direction. The connection to the drive sprocket of cam member 55 through pins 60 causes the cam bar to turn also in a clockwise direction, thus bringing its outwardly convex surface 55a into engagement with the inclined cam surfaces 52a on cam elements 52. The relative inclination of these engaging surfaces on the two cams causes relative axial movement of driven disc 48 and cam 55. Cam bar 55 is restrained against outward movement by spring means 57 and is thus by its rotation able to apply an axial thrust against the driven clutch disc 48, moving the driven disc into a driving or torque-transmitting relation with driving disc 47. Rotation of clutch disc 48 in the clockwise direction rotates shaft 18 in that same direction since engagement of pin 49 with the clutch disc causes the driven clutch disc and shaft 18 to rotate together.

This state continues until carriage 31 reaches the right-hand end of its travel path at which time it comes into engagement with resilient abutment 39, as shown in FIG. 1. Contact of the carriage against spring 39 causes elastic deformation of the spring, one result of which is to slow down and ultimately stop carriage 31. The increasing resistance to movement thus imposed on carriage 31 increases the load on the transmission system and consequently increases the amount of torque which must be transmitted by the clutch.

A point is reached at which the torque required to move load 31 exceeds the limit of the torque which can be transmitted, this torque-limiting action being produced by the cams 52 and 55 and spring 57. This point is reached when cam bar 55 rides over inclined surfaces 52a and down the oppositely inclined slope 52b, bringing he driven cam member 55 into the relative position with respect to clutch disc 48 shown in solid lines in FIG. 3 and also in FIG. 6. Here cam bar 55 is midway between cam elements 52 and may be considered as being momentarily out of contact with either cam 52. At this position cam 55 is not exerting any axial thrust on disc 48 because the cam bar has moved off of the cooperating cam elements 52 and spring 57 exerts no thrust on the cam, thereby reducing the thrust against clutch disc 48 to zero or substantially so. At this condition torque is no longer transmitted by the clutch. In fact, shaft 18 is effectively decoupled from the power source and is free to be moved by any other forces acting upon it.

These other forces are either or both of two different ones. In the first place, it will be appreciated that as cam bar 55 slides over the high point on reversely inclined cam 52 and down on the descending incline provided by clutch surface 52b, the effect is to rotate clutch disc 48 in the opposite direction to the rotation imparted by the power source and cam 55, while at the same time decreasing the axial thrust on the clutch disc. Hence there is here not only a freeing of shaft 18 by the over-center travel of cam 55 but the imposition on the shaft of a force tending to move it in a reverse direction to that in which it has just been driven.

The other force is that exerted by the elastic deformation of spring 39. Compression of this spring stores in it a certain amount of energy which, when released, restores the spring to its original length and by its expansion moves carriage 31 a short distance to the left, back to the position of initial contact with the spring. This movement of carriage 31 from right to left by spring 39 regaining its original shape causes a momentary reverse movement of shaft 18.

The frictional engagement of control arm 64 with shaft 18 causes the control arm to tend to follow at all times the movements of the output shaft; and this brief reverse rotation of shaft 18 which is brought about by either or both of the two forces just mentioned now causes control arm 64 to move upwardly from the solid line position to the dotted line position, shifting switch arm 68 to the dotted line position 68a. This opens the circuit that supplies power to the motor and stops the motor. The parts now come to rest in the position shown in FIGS. 1 and 3.

The next time that the motor circuit is energized, assume it is done by pressing push button 92. As explained before, upon each energization of the circuit, coil 90 causes switch 85 to shift between alternate closed positions with the consequence that the next subsequent energization of motor 10 causes it to rotate in the opposite direction to its last previous movement. As a consequence, carriage 31 now moves from the right-hand end of the travel toward the left-hand of track 30, which is assumed to be in a direction to close a door operated by rod 36. It might be mentioned here that at the end of each stroke, cam 55 comes to rest in a neutral position, i.e., it is not in engagement with either cam 52. Hence, motor 10 starts under a no-load condition, which is a distinct advantage.

Under these circumstances, the operations just described again takes place, except in the reverse direction of rotation. Briefly, sprocket 22, now rotating counterclockwise, carries with it cam bar 55. This cam member now presses against the two inclined surfaces 52b of cam element 52 on the driven clutch disc. Since outward movement along shaft 18 of the cam bar is limited by engagement with spring 57, a condition of equilibrium is quickly reached in which the cam exerts sufficient thrust against the driven clutch disc that the two clutch discs are held in torque-transmitting relation and shaft 18 is rotated counterclockwise. This continues until carriage 31 reaches the spring abutment 38 which is then elastically deformed by engagement with carriage 31.

The consequent change in speed of the carriage causes an increase in the load on the system with a consequent requirement that te clutch transmit greater torque. When the torque required exceeds the limit established by the adjustment given to spring 57, cam 55 compresses the spring sufficiently to ride over cam element 52 and down on the reversely sloping surfaces 52a. This releases the clutch and shaft 18 is disconnected from the power source.

As previously described, the movement of cam bar 55 down surfaces 52a, combined with the release of the energy stored in spring abutment 38 when it expands to restore spring 38 to its normal shape and size, causes a momentary reversal in the direction of rotation of shaft 18. This reversal is now in a clockwise direction so that arm 64, which during the normal range of movement of carriage 31 has been resting against the upper edge of opening 66, now rotates clockwise through the arc 67, causing switch arm 68 to shift to the alternate position 68a. This movement of the switch arm opens the circuit through motor 10, de-energizes the motor, and stops the operation of the power transmitting system.

It is desired to point out that broadly speaking the spring abutments 38 and 39 represent energy storing means available to effect this reverse rotation of output shaft 25 when it is suddenly freed, by disengagement of the clutch means, from connection with the power source. Consequently, other energy storing elements than the spring abutments 38 and 39 may be incorporated in the system to perform this function. For example, a spring can be inserted into drive chain 28 at each end thereof as a replacement for several of the links. Such a spring 95 is located preferably adjoining a fixed point of attachment, as shown in FIG. 9. Extension of the spring may be limited by rod 96.

Carriage 31 may be considered as the load on the power transmitting system; and by analogy the spring means may be associated with the door (not shown) or other object connected to carriage 31 by rod 36. Also, some installations have sufficient inherent resiliency to undergo elastic deformation and cause shaft 18 to reverse as the load springs back to normal size and/or shape.

Although the invention has been illustrated and described as embodied in a door operator, the invention is not necessarily so limited. It is particularly advantageous when a load moves repeatedly over a given path; but this feature is not limitative on the invention. The clutch and torque limiting assembly can be used as an overload safety device in a continuous drive, the overload causing power to be shut off or other remedial action initiated in response to tripping switch 69.

This change is but one of various changes in the detailed construction and design of the parts of my improved power transmitting system which may be made by persons skilled in the art but without departing from the spirit and scope of the present invention. Accordingly, it is to be understood that the foregoing description is considered as being illustrative of, rather than limitative upon, the invention as defined by the appended claims.

I claim:
1. A load limiting power transmitting system, comprising:
   a rotatable shaft operatively connected to a load;
   a power input member rotatably mounted concentrically with the shaft;
   clutch means, including a driven element nonrotatably connected to the shaft, transmitting power from the input member to said shaft;
   cam and spring means applying predetermined maximum thrust to said clutch means to limit the torque transmitted by the clutch means,
   said cam and spring means releasing the clutch at a predetermined value of said torque;
   means effective when the clutch is released to reverse the direction of shaft rotation momentarily;
   and a control arm frictionally engaging the shaft and rocked between two different control positions by forward and reverse rotation of the shaft.

2. A load limiting power transmitting system as in claim 1 in which the clutch means includes a driving element engaging said driven element,
and the spring means presses the driven element axially of the shaft against the driving element.

3. A load limiting power transmitting system as in claim 2 in which the spring means is adjustable to limit the torque transmitted by the clutch.

4. A load limiting power transmitting system as in claim 1 in which the cam and spring means includes
a cam surface concentric with the axis of the shaft and inclined in an axial direction;
a second cam rotating with the power input member and movable axially of the shaft relative to the cam surface;
and spring means urging the second cam axially of the shaft and against the cam surface.

5. A load limiting power transmitting system as in claim 4 in which the cam surface has reversely sloping inclines.

6. A load limiting power transmitting system as in claim 1 in which the means to momentarily reverse the shaft includes an extension of the cam means.

7. A load limiting power transmitting system as in claim 1 in which the means to momentarily reverse the shaft includes spring means elastically deflected in response to movement of the load, said spring means upon resuming normal position producing reverse rotation of the shaft.

8. A load limiting power transmitting system as in claim 7 in which the spring means is associated with the load and is deflected as the load reaches the end of its normal range of travel.

9. A power transmitting system, comprising:
an output shaft operatively connected to a load moving in a linear path;
a power input member;
motor means driving said input member;
clutch means transmitting power from the input member to the output shaft;
torque-limiting means cooperating with the clutch means;
spring means elastically deflected by the load when reaching one end of said path;
and an arm frictionally engaging the output shaft to turn about the axis of the shaft and engaging a switch controlling power to said motor, said switch being operated by angular movement of the arm; the spring means after deflection and release of the clutch causing limited reverse movement of the load and the arm to thereby operate the switch and de-energize the motor.

10. A power transmitting system as in claim 9 in which the motor is reversible and energizable by a circuit including reversing means and which includes spring means at each end of the path of said load whereby the arm actuates said switch at each end of the path of the load.

11. A power transmitting system as in claim 10 in which
the clutch means comprises a pair of clutch discs concentric with the output shaft, one disc being a drive disc attached to the input member and the other being a driven disc non-rotatably mounted on the output shaft but movable axially thereof;
and the torque-limiting means comprises a cam member rotating in unison with the input member, a cam element on the driven disc engageable with the cam member, and spring means urging the cam member axially against the cam element to hold the two clutch discs in driving relation, said spring means yielding when the torque transmitted exceeds a predetermined value.

12. A load limiting system as in claim 9 in which the torque-limiting means comprises a pair of relatively rotatable cam elements concentric with the output shaft and movable axially of each other to release the clutch means.

13. A power transmitting system, comprising:
an output shaft operatively connected to a load moving in a linear path;
a power input member;
motor means driving said input member;
circuit means including a multi-section switch controlling power supply to said motor;
clutch means transmitting power from the input member to the output shaft;
torque-limiting means cooperating with the clutch means;
spring means elastically deflected by the load when reaching one end of said path;
an arm frictionally engaging the output shaft to turn about the axis of the shaft;
said arm actuating one section of said switch and the spring means after deflection and release of the clutch causing limited reverse movement of the load and the arm to thereby operate the switch and de-energize the motor;
and solenoid means in said circuit means that when energized actuates another section of the switch to re-close the power supply circuit to the motor.

References Cited

UNITED STATES PATENTS

| 2,901,076 | 8/1959 | Dean | 192—150 |
| 3,233,162 | 2/1966 | Richmond | 192—150 X |

MARK NEWMAN, *Primary Examiner.*

A. T. McKEON, *Assistant Examiner.*